United States Patent
Shaked et al.

(10) Patent No.: US 10,341,103 B2
(45) Date of Patent: Jul. 2, 2019

(54) DATA ANALYTICS ON ENCRYPTED DATA ELEMENTS

(71) Applicant: Hewlett Packard Enterprise Development LP, Houston, TX (US)

(72) Inventors: Doron Shaked, Tivon (IL); Omer Barkol, Haifa (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 172 days.

(21) Appl. No.: 15/325,800

(22) PCT Filed: Jan. 29, 2015

(86) PCT No.: PCT/US2015/013447
§ 371 (c)(1),
(2) Date: Jan. 12, 2017

(87) PCT Pub. No.: WO2016/122513
PCT Pub. Date: Aug. 4, 2016

(65) Prior Publication Data
US 2017/0170960 A1  Jun. 15, 2017

(51) Int. Cl.
*H04L 9/14* (2006.01)
*H04L 29/06* (2006.01)
(Continued)

(52) U.S. Cl.
CPC ............. *H04L 9/14* (2013.01); *H04L 9/008* (2013.01); *H04L 63/0442* (2013.01);
(Continued)

(58) Field of Classification Search
CPC . H04L 9/14; H04L 67/22; H04L 9/008; H04L 63/0442
See application file for complete search history.

(56) References Cited

U.S. PATENT DOCUMENTS 8,073,950 B2   12/2011   Goodermote et al.
8,601,257 B2   12/2013   Vishwanathan
(Continued)

OTHER PUBLICATIONS

Chakravoty et al., "Privacy Preserving Data Analytics for Smart Homes," 2013 IEEE Security and Privacy Workshops Year: 2013 pp. 23-27.*
(Continued)

*Primary Examiner* — Roderick Tolentino

(57) ABSTRACT

Data analytics on encrypted data elements is disclosed. One example is a system including a first data system, a second data system, and a data analytics system. The first data system includes a first data element and a first encryption module with a first private key. The second data system includes a plurality of second data elements and a second encryption module with a second private key. The first encryption module and the second encryption module are communicatively linked to one another, to apply, via the first and second private keys, an encryption protocol to the first data element and the plurality of second data elements to encrypt the data elements. The data analytics system maps the encrypted data elements to an analytics space, performs data analytics based on the mapped data elements, and distributes, via a computing device, results of the data analytics to an information retrieval system.

13 Claims, 4 Drawing Sheets

(51) Int. Cl.
*H04L 9/00* (2006.01)
*H04L 29/08* (2006.01)

(52) U.S. Cl.
CPC ...... *H04L 67/22* (2013.01); *G06F 2221/2111* (2013.01); *H04L 2209/46* (2013.01)

(56) References Cited

U.S. PATENT DOCUMENTS

| | | | |
|---|---|---|---|
| 8,761,397 | B1 | 6/2014 | Wright |
| 8,930,687 | B1 | 1/2015 | Robinson et al. |
| 2003/0021419 | A1 | 1/2003 | Hansen et al. |
| 2007/0094384 | A1 | 4/2007 | Matsumura et al. |
| 2012/0131075 | A1* | 5/2012 | Mawdsley .......... G06F 21/6254 707/825 |
| 2012/0221623 | A1 | 8/2012 | Ebrahimi et al. |
| 2013/0010950 | A1* | 1/2013 | Kerschbaum .......... H04L 9/008 380/30 |
| 2013/0246802 | A1* | 9/2013 | Kerschbaum .......... H04L 9/00 713/189 |
| 2014/0006244 | A1 | 1/2014 | Crowley et al. |
| 2014/0019498 | A1* | 1/2014 | Cidon .................. G06F 16/11 707/827 |
| 2014/0164776 | A1 | 6/2014 | Hook et al. |
| 2014/0331044 | A1* | 11/2014 | Fujii .................. H04L 9/3239 713/165 |
| 2014/0351043 | A1 | 11/2014 | Agarwal et al. |
| 2014/0355756 | A1* | 12/2014 | Iwamura .............. H04L 9/008 380/30 |
| 2015/0181409 | A1* | 6/2015 | Chang ................. H04W 8/18 455/410 |
| 2015/0200783 | A1* | 7/2015 | Abt, Jr. ............. G06F 21/6245 713/176 |
| 2015/0286825 | A1* | 10/2015 | Freudiger .............. G06F 21/60 726/26 |
| 2016/0094567 | A1* | 3/2016 | Borland ............. H04L 63/0457 713/154 |
| 2018/0114028 | A1 | 4/2018 | Kafai et al. |

OTHER PUBLICATIONS

Lu et al., "Toward efficient and privacy-preserving computing in big data era," Year: 2014, vol. 28, Issue: 4 pp. 46-50.*
Kaghazgaran et al., "Secure two party comparison over encrypted data," 2011 World Congress on Information and Communication Technologies Year: 2011 pp. 1123-1126.*
Aggarwal, et al "Secure Computation of the kth-Ranked Element", EUROCYPT 2004, 18 pages.
Agrawal, et al., "Information Sharing Across Private Databases", SIGMOD 2003, 12 pages.
Bogetoft, et al., "Secure Multiparty Computation Goes Live", Data Security 2009, 13 pages.
Denning, "Secure Statistical Databases with Random Sample Queries", ACM Transactions on Database Systems, vol. 5, No. 3, Sep. 1980, pp. 291-315.
Dwork, et al., "The Algorithmic Foundations of Differential Privacy", Foundations and Trends in Theoretical Computer Science, vol. 9, Nos. 3-4, 2014, 281 pages.
Gentry, et al., "Implementing Gentry's Fully-Homomorphic Encryption Scheme", EUROCRYPT, Feb. 4, 2011, 29 pages.
Kiltz, et al., "Secure Computation of the Mean and Related Statistics", Theory of Cryptography Conference, 2005, 20 pages.
Lindell, et al., "Privacy Preserving Data Mining", Journal of Cryptography, vol. 15, No. 3, 2004, 26 pages.
Silverberg, "Fully Homomorphic Encryption for Mathematicians", Contemporary Mathematics #606, 2013, 10 pages.
Quality Case Insight Data Warehouse And Analytics; http://uk.gdit.com/globalassets/gduk1/quality-care-insight-data-warehouse-and-analytics.pdf.

* cited by examiner

DATA ANALYTICS ON ENCRYPTED DATA ELEMENTS

BACKGROUND

Secure protocols are generally employed to allow computation involving data from multiple parties to be performed without the data being revealed to any of the involved or third parties. The result can however be made available to the parties. For example, a requesting party can retrieve information from another party without revealing the content of the query on one hand or the data of the other party on the other hand. Relevant data may be encrypted using a security key, data analytics may be performed on the encrypted data, and results of the analytics may be provided to the requesting party.

DETAILED DESCRIPTION

Figure 1:
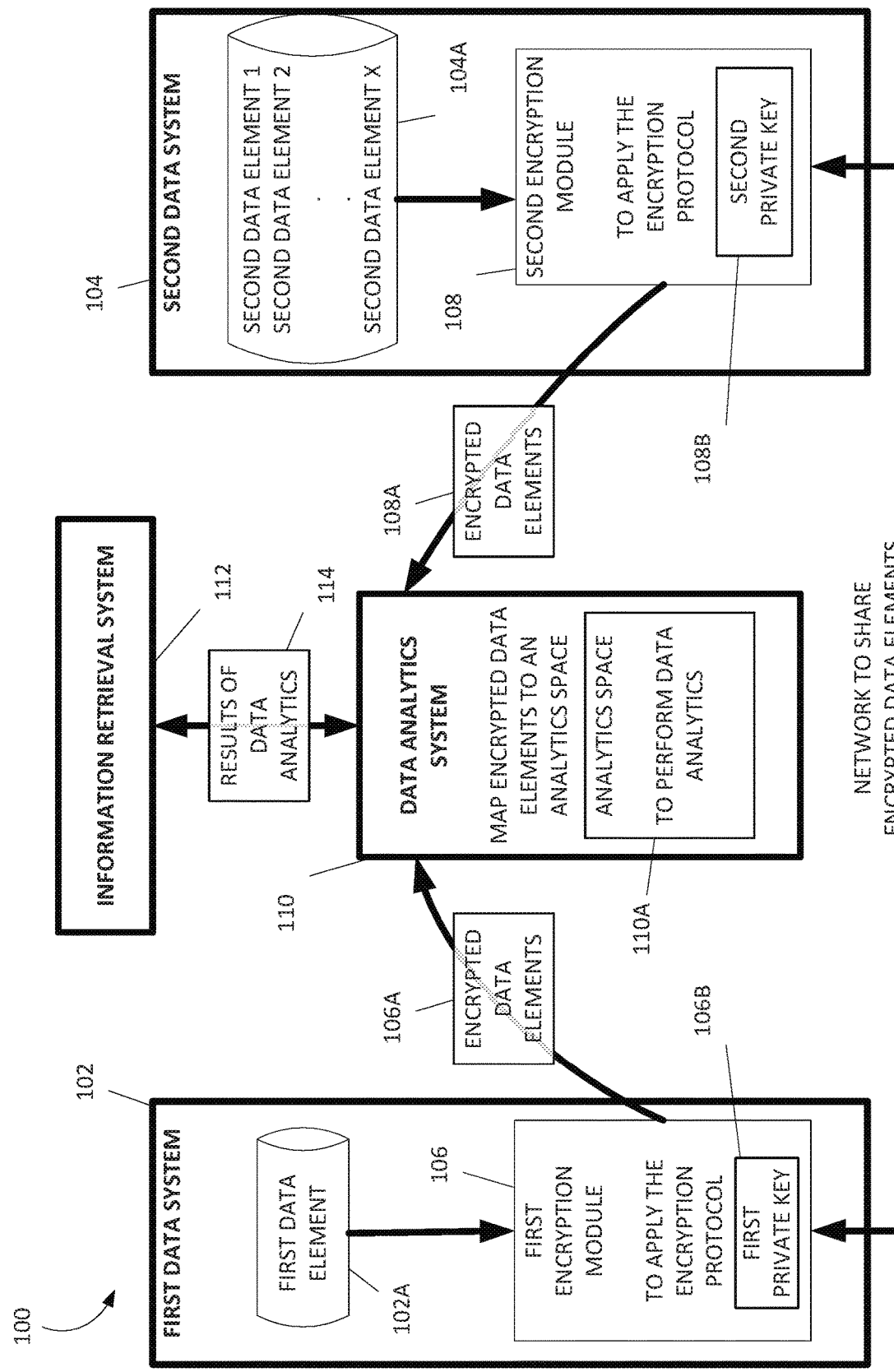
FIG. 1 is a functional block diagram illustrating one example of a system for data analytics on encrypted data elements.

The need for analytics on sensitive data from two or more parties has grown in recent years. Security protocols are often required to comply with regulatory and privacy constraints on data sharing. Joint analytic tasks may be performed on private datasets. Privacy preserving Analytics on private datasets may include a wide range of tasks, from SQL primitives, through association rule mining, to classification methods. However, each analytic task is generally associated with its own protocols, methodologies and trust assumptions. Existing security protocols are often unique to each analytic task, performing one specific pre-determined function, and may therefore be unsuitable for wider applicability. Also, for example, design of privacy preserving protocols may be non-trivial, making them less adaptable to changes in the business and/or data environment.

Existing protocols may include statistical operators, specific SQL primitives, data mining like classification, and auctions. However, none of these provide a single transformation that may support a wide range of analytic functions not specified at the outset of the process. Also, for example, some existing procedures establish statistical database protocols that may preserve the privacy of individual records. Although statistical databases may make such formal statistical assurances through differential privacy, repeated utilization of statistical databases may reduce their privacy protection—or alternatively deteriorate their efficacy.

General approaches to data privacy may include Fully Homomorphic Encryption ("FHE") schemes. Such encryptions may allow the execution of a general sequence of operations on the encrypted data, whereby the output may be encrypted in the same manner—and decrypted only by those who have the appropriate key. FHE is mainly utilized for private cloud computation, where cloud providers may be oblivious of the data they store, and may still perform analytics on the data. Although there are versions of FHE for secure multiparty computation, their practical implementation as a general methodology may be infeasible because execution of FHE is complex. Accordingly, there is a need to provide a security protocol to perform a wide range of analytic tasks in a secure manner.

Generally, in most existing protocols, privacy protection and data analytics are intertwined, thereby making it difficult to perform diverse data analytic tasks. As disclosed herein, privacy protection may be decoupled from data analytics. Disclosed herein is a unified platform including a protocol, methodology, and trust assumption that allows for a wide range of analytic tasks, and that respects dataset privacy. Such a platform may facilitate collaborative analytic networks of business collaborators and competitors (or coopetitors) that may address privacy and proprietary concerns of participants, and at the same time, enable them to engage in diverse analytic computations on a joint dataset. Such a platform may be utilized by financial institutions, governments, and/or trade associations to establish a privacy preserving joint analytic network.

Generally, as disclosed herein, a privacy protection part may map private datasets, such as X and Y, from two vendors, to a common map M(X, Y), that supports diverse data analytics. In some examples, M(X, Y) may be derived from encrypted data elements from the first data system 102, and encrypted data elements from the second data system 104 by way of comparing and looking for identical encryptions. Accordingly, the common map may be disclosed to a mediator exclusively (without even the parties being exposed to the map), where a variety of analytic tasks may be performed by the mediator. Such analytic tasks may be defined as goals on the map M(X, Y) instead of preset functions. The mediator may be exposed to encrypted forms of the private datasets X and Y, and to an agreed upon mapping of the datasets that provides the basis for the analytic services the mediator performs for the participating private vendors. The agreed upon mapping may be, for example, an intersection space identifying (the index of) items in X identical to (indexed) items in Y, or a common metric space into which X and Y may be embedded in which case M(X, Y) is an approximate distance between items of X and Y. As such, the mediator may serve as a blind analytic engine performing an agreed upon operation such as determining how many items in X are closer than a threshold distance to items in Y without knowing the content of the data. The mediator may also serve as a blind protector, implementing throttle limits on participant queries. Accordingly, the mediator has little or no insight to the encrypted data, but is able to provide significant analytic results.

As described in various examples herein, data analytics on encrypted data elements is disclosed. One example is a system including a first data system, a second data system, and a data analytics system. The first data system includes a first data element and a first encryption module with a first private key. The second data system includes a plurality of second data elements and a second encryption module with a second private key. The first encryption module and the second encryption module are communicatively linked to one another, to apply, via the first and second private keys, an encryption protocol to the first data element and the plurality of second data elements to encrypt the data elements. The data analytics system maps the encrypted data elements to an analytics space, performs data analytics based on the mapped data elements, and distributes, via a computing device, results of the data analytics to an information retrieval system.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for system for data analytics on encrypted data elements. The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the Internet, part of an intranet, and/or any other type of network. In some examples, the network may be a secured network.

The components of system 100 may be computing resources, each including a suitable combination of physical computing devices, virtual computing devices, networks, software, cloud infrastructures, hybrid cloud infrastructures that include a first cloud infrastructure and a second cloud infrastructure that is different from the first cloud infrastructure, and so forth. The components of system 100 may be a combination of hardware and programming for performing a designated function. In some instances, each component may include a processor and a memory, while programming code is stored on that memory and executable by a processor to perform a designated function.

The computing device may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform data analytics on encrypted data elements. Computing device may include a processor and a computer-readable storage medium.

Secure computation is about providing a way for parties with private data to compute a function of their data without disclosing the data to each other or anyone else. For example, Alice may have data X, and Bob may have data Y, and Alice and Bob may want to compute F(X, Y). There are protocols that provide a way for them to do that securely. Simple examples of F(X, Y) include the Millionaires problem where X and Y are numbers and F is the bit indicating which number is larger. Another example is a Private Set Intersection ("PSI") where X, and Y are sets, and F is their intersection.

Many protocols are known for various functions, and such protocols may be secure against semi-honest participants, i.e., participants who want to glean more than a mutually agreed upon function F (e.g. Alice cannot estimate the length of Y from the length of the protocol—unless it can be estimated from X and F(X, Y)). Also, for example, such protocols may be secure against a malicious participant who may want to adversarially modify the agreed protocol. For example, in a simple adversarial example, Alice cannot modify the protocol, so she knows F(X^true, Y), and Bob knows F(X^false, Y).

Nevertheless, for a business to be established on top of secure computation protocols there may be additional security gaps. For one, the set of secure protocols may be limited and inflexible. Also, for example, multiple applications of a secure protocol in sequence, or several secure protocols in parallel may not provide the same level of security.

For example if we apply PSI between a set X from Alice and a series of sets $Y_t$ from Bob, both Alice and Bob obtain a series of intersections $I_t$, which exposes the parties to more than any single application. For example, assuming $Y_t$ are diverse, the total coverage of X may be comprehensive (most or all of it may be known to Bob). On the other hand, Alice may also have information about Bob's component distribution (e.g., how often each element appeared). Nevertheless, Alice and Bob may be able to deduce powerful analytics from the obtained intersection data. For example, they may compute time dependent trends or changes, they may compute statistical correlations, and they may engage in cohort analysis. As disclosed herein, decoupling the privacy aspect from the data analytics aspect allows Alice and Bob to perform varied data analytics, while maintaining data privacy. Accordingly, data privacy may be preserved by a first encryption module and a second encryption module, whereas data analytics on encrypted data elements may be performed by a data analytics system.

Generally, the key to secure data sharing and information retrieval is ensuring data privacy. Accordingly, data is generally stored at distinct locations. As described herein, system 100 comprises multiple systems, where each system may be associated with a secure database that stores data, and data is encrypted and shared across networks.

In some examples, system 100 includes a first data system 102 and a second data system 104. The first data system 102 includes a first data element 102A and a first encryption module 106 with a first private key 106B. The second data system 104 includes a plurality of second data elements 104A and a second encryption module 108 with a second private key 108B. The data systems may be secured systems including respective databases to store data elements, and networks to share encrypted data elements. In some examples, each data system may be behind a respectively secure firewall to prevent unauthorized access to data. In some examples, data elements may be N-dimensional vectors with numerical, real-valued components.

In some examples, the first encryption module 106 and the second encryption module 108, may be communicatively linked to one another, to apply, via the first and second private keys 106B and 108E respectively, an encryption protocol to the first data element 102A and the plurality of second data elements 104A. An encryption protocol, as used herein, is a protocol to generate, via a computing device, encrypted data elements, and to share the encrypted data elements between parties. The encryption protocol may be an application of one encryption to data elements, or a sequence of multiple encryptions applied to the data elements. In some examples, the sequence of multiple encryptions may include applying an encryption to a previously encrypted data element. Generally, encrypted data elements are generated by the parties using respective private keys. Generally, the encryption protocol may include a key sharing agreement, a process to authenticate data elements and/or parties, and public key cryptography. System 100 includes a data analytics system 110 to map the encrypted data elements 106A and 106B to an analytics space 110A, perform data analytics based on the mapped data elements, and distribute, via the computing device, results of the data analytics 114 to an information retrieval system 112. In some examples, first data system 102, second data system 104, data analytics system 110, and information retrieval system 112, are communicatively linked to each other.

As described herein, data privacy functions and data analytics functions are performed by separate components of system 100. Data privacy functions are performed by the first data system 102 and the second data system 104, whereas data analytics functions are performed by the data analytics system 110. As described herein, the first data system 102 includes a first data element 102A and a first encryption module 106. The first data system 102 and/or the first encryption module 106 may include a first private key 106B for data encryption. The first encryption module 106 may retrieve the first data element 102A for encryption. The second data system 104 includes a plurality of second data elements 104A and a second encryption module 108. The second data system 104 and/or the second encryption module 108 may include a second private key 108B for data encryption. The second encryption module 108 may retrieve the plurality of second data elements 104A for encryption. The first encryption module 106 and the second encryption module 108 may apply, via the first and second private keys 106B and 108B respectively, an encryption protocol to the first data element 102A and the plurality of second data elements 104A. In some examples, the first encryption module 106 and the second encryption module 108 may share encrypted data across networks to generate the encrypted data elements 106A and 108A. In some examples, the first encryption module 106 may provide encrypted data elements 106A to the data analytics system 110. In some examples, the second encryption module 108 may provide encrypted data elements 108A to the data analytics system 110.

The first data system 102 may be a combination of hardware and programming for performing a designated function. For example, the first data system 102 may include a database with physical memory to store the first data element. Also, for example, the first data system 102 may include programming to apply the encryption protocol. In some instances, the first data system 102 may include a processor and a memory, while programming code is stored on that memory and executable by a processor to perform the designated function.

Likewise, the second data system 104 may be a combination of hardware and programming for performing a designated function. For example, the second data system 104 may include a database with physical memory to store the plurality of second data elements. Also, for example, the second data system 104 may include programming to apply the encryption protocol. In some instances, the second data system 104 may include a processor and a memory, while programming code is stored on that memory and executable by a processor to perform the designated function.

In some examples, the data analytic system 110 receives encrypted data elements 106A from the first encryption module 106, and receives encrypted data elements 108A from the second encryption module 108. In some examples, the data analytic system 110 maps the encrypted data elements into an analytics space 110A. The analytics space 110A is a common space that data elements may be mapped to for data analytics. The analytics space 110A is generally structured to enable comparison of data elements. In some examples, the analytics space 110A may be an intersection space. For example, the encrypted data elements may be mapped to a common intersection space where intersections between various data elements may be determined. For example, hashed data elements may be compared to determine the number of common hashes in pairs of data elements. Also, for example, the analytics space 110A may be a metric space, and the encrypted data elements may be embedded into the metric space. The distance between a pair of data elements in the metric space may be indicative of similarities between the pair of data elements.

Once the encrypted data elements are mapped into the analytics space 110A, data analytics on encrypted data elements may be performed on the secured data by the data analytics system 110. The data analytics system 110 performs data analytics, in the analytics space 110A, based on the mappings of the encrypted data elements 106A received from the first encryption module 106, and based on the mappings of the encrypted data elements 108A received from the second encryption module 108. The data analytics system 110 distributes, via a computing device, results of the data analytics 114 to an information retrieval system.

In some examples, the first encryption module 106 applies the security protocol including applying a first encryption to the first data element 102A, and provides the encrypted first data element to the second encryption module 108 over a data network. The second encryption module 108 in turn applies the plurality of second encryptions to the encrypted first data element to generate a plurality of modified encrypted first data elements 108A. The second encryption module 108 provides the modified encrypted first data elements 108A to the data analytics system 110.

Likewise, in some examples, the second encryption module 108 applies the security protocol including applying a plurality of second encryptions to the plurality of second data elements 104A, and provides the plurality of encrypted second data elements to the first encryption module 106. The first encryption module 106 in turn applies the first encryption to the plurality of encrypted second data elements to generate a plurality of modified encrypted second data elements 106A. The first encryption module 106 provides the modified encrypted second data elements 106A to the data analytics system 110. The data analytics system 110 then maps datasets 108A and 106A to an analytic space.

More formally, the first encryption module 106 and the second encryption module 108 may share a hash function H. For example, Alice and Bob may share a hash function H in respective computing devices. In some examples, hash transformers may transform the first data element 102A and the plurality of second data elements 104A. For example, the transformation of the first data element 102A and the plurality of second data elements 104A may be based on a hash function H, as known in the literature. In one example, system 100 may be provided with hash function H.

In some examples, the first encryption module 106 may include a first encryption. For example, Alice may be in possession of a private key $\alpha$. Alice has a first data element $X=\{x_1, x_2, \ldots, x_N\}$. Alice may share with Bob the following transforms of the elements of X: $(H(x_i))^\alpha$ for each i.

Similarly, the second encryption module 108 may include a plurality of second encryptions. For example, Bob may be in possession of a plurality of private keys $\beta_t$. Bob has a plurality of second data elements $Y_t=\{y_1^t, y_2^t, \ldots, y_N^t\}$ for a plurality of values t. Bob may share with Alice the following transforms of the elements of $Y_t$: $(H(y_j^t))^{\beta_t}$, for each j and t.

Next, the first encryption module 106 may provide the encrypted data elements 106A to the analytics space 110A to be accessed by the data analytics system 110. For example, Alice may share with the mediator a transform of the message from Bob: $((H(y_j^t))^{\beta_t})^\alpha$, for each j and t. Likewise, Bob may share with the mediator a transform of the message from Alice: $((H(x_i))^\alpha)^{\beta_t}$, for each i and t. The security of this protocol may be shown to be equivalent to a Diffie-Hellman key exchange protocol.

In some examples, the data analytics system 110 may compare the various hashed and encrypted sets, and if it finds, for a given t and two indices i, and j, that $((H(x_i))^\alpha)^{\beta_t} = ((H(y_j^t))^{\beta_t})^\alpha$, the data analytics system 110 may deduce that the unknown $i^{th}$ element of Alice is the same as the unknown $j^{th}$ element of the $t^{th}$ dataset of Bob. Accordingly, the analytics space 110A may be populated with an indication of secure intersection. The data analytics system 110 may map the encrypted data elements 106A and 108A to an analytics space 110A, and perform data analytics based on the mapped data elements. In some examples, the data analytics system 110 may map the encrypted data elements 106A and 108A to the analytics space 110A based on one of a secured determination of an intersection space for the encrypted data elements 106A and 108A, or an embedding of the encrypted data elements 106A and 108A in a metric space.

In some examples, each data element may be augmented to enhance security. For example, when the data element is a numerical vector, the length of the vector may be increased by adding random numbers to an agreed upon length—say N. This prevents the first encryption module 106 from deducing the sizes of the second data elements, and prevents the second encryption module 108 from deducing the size of the first data element. Additionally, the data analytics system 110 may also not deduce the sizes of the respective sizes of the encrypted data elements prior to encryption. Nevertheless, the data analytics system 110 is able to perform data analytics based on, for example, the intersections.

Accordingly, the data analytics system 110 may apply any agreed upon analytics on the intersection sets, and communicate the results of the data analytics 114 to the information retrieval system 112. The information retrieval system 112 will know nothing more than the results of the agreed upon analytics.

As described herein, in some examples, the data analytics may be based on an embedding of the data elements in a metric space. For example, the data elements may be embedded in an appropriate metric space, and a distance measure may be utilized to perform analytics on the data elements, without the data elements be known to external parties or the mediators.

In some examples, locality sensitive hash ("LSH") functions may be utilized. For example, the LSH functions may be $LSH^k(.)$. The LSH function may be applied to the first data element 102A to generate $LSH^k(x_i)$ for each k and i. The LSH function may be applied to the second data elements 104 to generate $LSH^k(y_j^t)$, for each k, t and j. Based on a secure intersection as described herein (e.g., based on the hash function and a double encryption) of the hash components, a distance measure $d(x_i, y_j^t)$ may be determined as known in the literature, for example by counting the number of matches (over the index k). Such a distance constitutes embedding in a metric space and may provide a basis for a richer set of analytic operators such as clustering, classification, regression, and so forth.

In some examples, the data analytics system 110 may identify a plurality of components of the first data element that appear frequently together in the plurality of second data elements. For example, each data element may be a vector with a plurality of components, and the data analytics system 110 may compare respective components of the first data element and each of the plurality of second data elements to identify components that appear frequently together. In some examples, components may be identified as appearing frequently together based on a frequency of occurrence of the components appearing together.

In some examples, the data analytics system 110 may identify data elements of the plurality of second data elements 104A that are similar to the first data element 102A. In some examples, the data analytics system 110 may perform cohort analysis by identifying data elements that behave as cohorts based on their data characteristics. In some examples, the data analytics system 110 may perform a type of orthogonal subspace clustering by identifying frequent value sets (i.e., values that tend to appear together for measurement items).

In some examples, the first data element 102A and the plurality of second data elements 104A may be identified based on a parameter, and the data analytics may include identifying one of trends and correlations based on the parameter. For example, when the parameter is time, the mapping M (X, Y) may be modified to a parameterized mapping M (X(t), Y(t), t), and the data analytics system 110 may identify common trends, correlations, as well as common changes. Also, for example, when the parameter is geographic location based, the mapping M (X, Y) may be modified to a parameterized mapping M (X(ρ), Y(ρ), ρ), and the data analytics system 110 may identify additional location based analytics.

In some examples, the data analytics system 110 may distribute, via a computing device, results of the data analytics 114 to an information retrieval system 112. In some examples, the distribution may be conditioned on, for example, the number of queries from the information retrieval system 112 (e.g. refusing multiple similar queries), or the number of elements (e.g. refusing to distribute results which are aggregation of less than a prescribed size of supporting data). Rationale for such distribution may be based on data protection (e.g. refusing multiple queries), or requiring large supporting data. In some examples, the rationale may be statistical rules precluding distribution of unqualified statistics to the information retrieval system 112.

The information retrieval system 112 is any system that may request the results of the data analytics 114. In some examples, the information retrieval system 112 is one of the first data system 102 and the second data system 104. For example, the data analytics system 110 may distribute, via the computing device, results of the data analytics 114 to the first data system 102. For example, the first data system 102 may be a first hospital interested in locating a plurality of patients that have symptoms similar to a first patient at the first hospital. Accordingly, the first hospital may want to retrieve information from a second hospital (the second data system 104). The two hospitals may share data based on the security protocol described herein, and the data analytics system 110 may identify a cohort of patients of the plurality of patients at the second hospital, who share symptoms similar to the first patient. Accordingly, the data analytics system 110 may distribute, via the computing device, results of the data analytics 114 to the first data system 102, in this example, the first hospital.

Similarly, data analytics system 110 may distribute, via the computing device, results of the data analytics 114 to the second data system 104, or to both the first data system 102 and the second data system 104. In some examples, the information retrieval system 112 may be distinct from the first data system 102 and the second data system 104. For example, a third party may be interested in analytics related to data stored in the first data system 102 and the second data system 104.

The data analytics system 110 may be a combination of hardware and programming for performing a designated function. For example, the data analytics system 110 may include programming to receive the mapped data elements, and perform data analytics in the analytics space 110A. Also, for example, the data analytics system 110 may include programming to be communicatively linked to the first encryption module 106, the second encryption module 108, and the information retrieval system 112. In some instances, the data analytics system 110 may include a processor and a memory, while programming code is stored on that memory and executable by a processor to perform designated functions.

Likewise, the information retrieval system 112 may be a combination of hardware and programming for performing a designated function. For example, the information retrieval system 112 may include programming to receive the results of the data analytics 114 from the data analytics system 110. Also, for example, the information retrieval system 112 may include programming to request results of the data analytics 114 from the data analytics system 110, the request based on an agreed upon data sharing protocol with, for example, the second data system 104. Also, for example, the information retrieval system 112 may include programming to be communicatively linked to the first data system 102, the second data system 104, and the data analytics system 110. In some instances, the information retrieval system 112 may include a processor and a memory, while programming code is stored on that memory and executable by a processor to perform designated functions.

Figure 2:
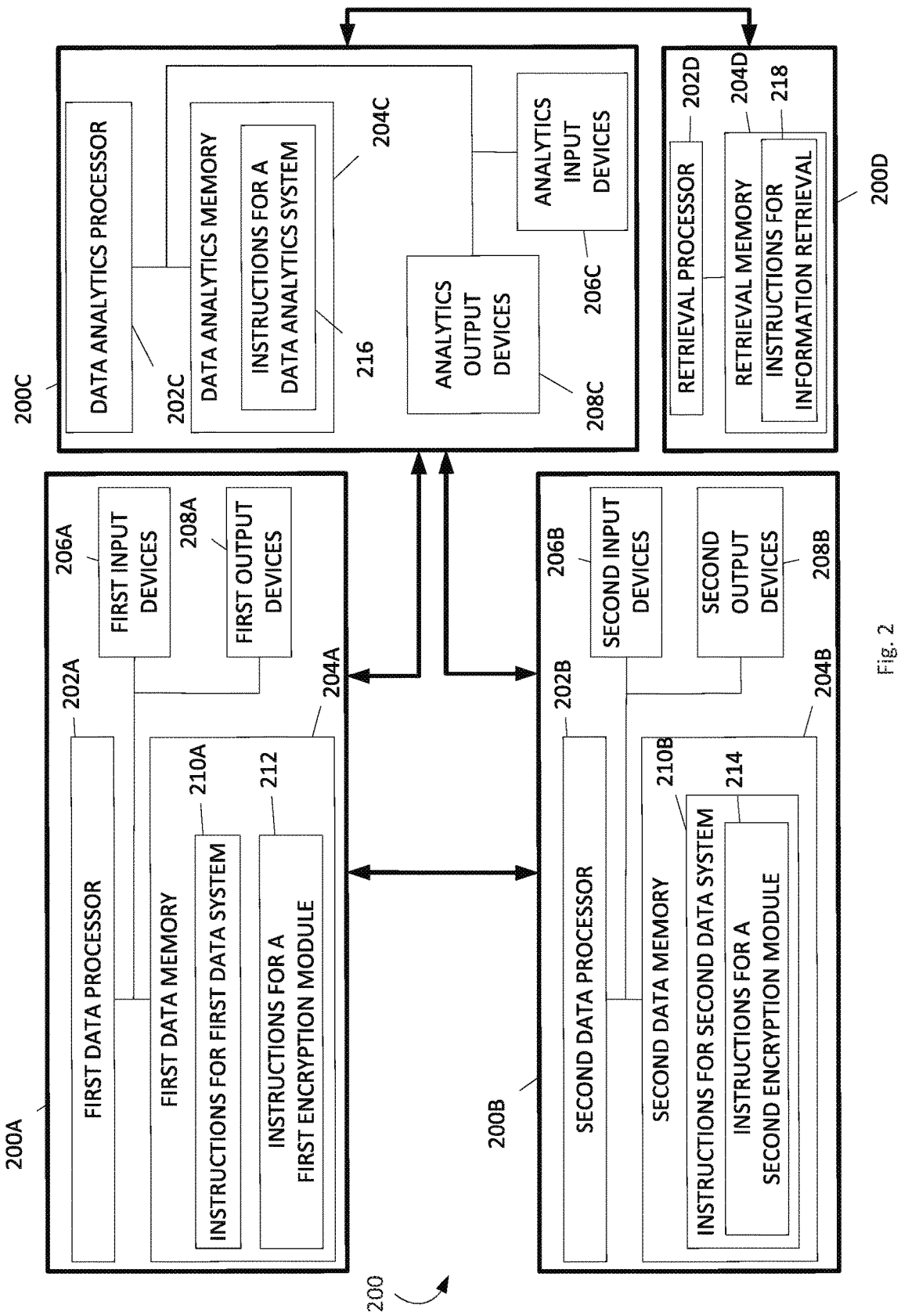
FIG. 2 is a block diagram illustrating one example of a processing system for implementing the system for data analytics on encrypted data elements.

FIG. 2 is a block diagram illustrating one example of a processing system 200 for implementing the system 100 for data analytics on encrypted data elements. Processing system 200 comprises a first processing system 200A, a second processing system 200B, an analytics processing system 200C, and a retrieval processing system 200C. The first processing system 200A, second processing system 200B, analytics processing system 200C, and retrieval processing system 200C are coupled to each other through communication link (e.g., a bus). In some examples, the first processing system 200A, second processing system 200B, analytics processing system 200C, and retrieval processing system 200C are coupled to each other through networks. In some examples, first processing system 200A, second processing system 200B, analytics processing system 200C, and retrieval processing system 200C are housed behind respective secure firewalls to prevent unauthorized access to respective data and computing resources.

First processing system 200A includes a first data processor 202A, a first data memory 204A, first input devices 206A, and first output devices 208A. First data processor 202A, first data memory 204A, first input devices 206A, and first output devices 208A are coupled to each other through communication link (e.g., a bus).

Second processing system 200B includes a second data processor 202B, a second data memory 204B, second input devices 206B, and second output devices 208B. Second data processor 202B, second data memory 204B, second input devices 206B, and second output devices 208B are coupled to each other through communication link (e.g., a bus).

Analytics processing system 200C includes a data analytics processor 202C, a data analytics memory 204C, analytics input devices 206C, and analytics output devices 208C. Data analytics processor 202C, data analytics memory 204C, analytics input devices 206C, and analytics output devices 208C are coupled to each other through communication link (e.g., a bus).

Retrieval processing system 200D includes a retrieval processor 202D, a retrieval memory 204D, retrieval input devices (not illustrated in FIG. 2), and retrieval output devices (not illustrated in FIG. 2). Retrieval processor 202D, retrieval memory 204D, retrieval input devices, and retrieval output devices are coupled to each other through communication link (e.g., a bus).

As described herein, processing system 200 is a complex processing system comprising sub-systems. For example, the first processing system 200A and the second processing system 200B may be respective systems housed behind respective secure firewalls that prohibit external access to data stored within each system. Also, for example, the first encryption module and the second encryption module may be sub-systems communicatively linked to one another, for example, to exchange encrypted data elements, and to establish a security protocol. However, while the first encryption module may be able to access a first data system, the first encryption module may be prohibited from accessing a second data system. Likewise, while the second encryption module may be able to access the second data system, the second encryption module may be prohibited from accessing the first data system.

Each processor (e.g., first data processor 202A, second data processor 202B, data analytics processor 202C, and retrieval processor 202C) includes a Central Processing Unit (CPU) or another suitable processor. In some examples, each memory (e.g., first data memory 204A, second data memory 204B, data analytics memory 204C, and retrieval memory 204D) stores machine readable instructions executed by respective processor for operating a respective processing system. Each memory includes any suitable combination of volatile and/or non-volatile memory, such as combinations of Random Access Memory (RAM), Read-Only Memory (ROM), flash memory, and/or other suitable memory.

In some examples, the first data system, second data system, first encryption module, second encryption module, data analytics system, and information retrieval system, include the first data system 102, second data system 104, first encryption module 106, the second encryption module 108, data analytics system 110, and information retrieval system 112, respectively, as previously described and illustrated with reference to FIG. 1.

In some examples, first data memory 204A stores the first data element in a first secured sub-system. In some examples, second data memory 204B stores the plurality of second data elements in a second secured sub-system distinct from the first secured sub-system. In some examples, the first data element may be stored on servers external to the first processing system 200A and may be accessible to first data processor 202A. For example, a storage medium associated with a first hospital may store the first data element. In some examples, the plurality of second data elements may be stored on servers external to the second processing system 200B and may be accessible to second data processor 202B. For example, a storage medium associated with a second hospital may store the plurality of second data elements.

First data memory 204A also stores instructions to be executed by first data processor 202A including instructions for first data system 210A, and instructions for a first encryption module 212. First data processor 202A executes instructions for first data system 210A to access a first data element. First data processor 202A executes instructions of the first encryption module 212 to apply, via a first private key, an encryption protocol to the first data element and the plurality of second data elements to encrypt the data elements.

Second data memory 204B also stores instructions to be executed by second data processor 202B including instructions for second data system 210B, and instructions for a second encryption module 214. Second data processor 202B executes instructions for second data system 210B to access a plurality of second data elements. Second data processor 202B executes instructions of the second encryption module 214 to apply, via a first private key, an encryption protocol to the first data element and the plurality of second data elements to encrypt the data elements.

In some examples, first data processor 202A executes instructions of the first encryption module 212 to apply the security protocol including applying a first encryption to a first data element. Second data processor 202B executes instructions of the second encryption module 214 to apply a plurality of second encryptions to a plurality of second data elements.

In some examples, first data processor 202A executes instructions of the first encryption module 212 to apply the first encryption to the plurality of encrypted second data elements. In some examples, the first data processor 202A may receive the plurality of encrypted second data elements from the second data processor 202B over a network. In some examples, first data processor 202A executes instructions of the first encryption module 212 to provide the modified encrypted second data elements to the data analytics system 216.

In some examples, second data processor 202B executes instructions of the second encryption module 214 to apply the plurality of second encryptions to the encrypted first data element. In some examples, the second data processor 202B may receive the encrypted first data element from the first data processor 202A over a network. In some examples, second data processor 202B executes instructions of the second encryption module 214 to provide the modified encrypted first data elements to the data analytics system 216.

Data analytics memory 204C also stores instructions to be executed by data analytics processor 202C including instructions for a data analytics system 216 to map the modified encrypted first data elements and modified encrypted plurality of second data elements into an analytics space. Data analytics memory 204C also stores instructions to be executed by data analytics processor 202C including instructions for a data analytics system 216 to perform data analytics in the analytics space. In some examples, data analytics processor 202C executes instructions of the data analytics system 216 to identify a plurality of components of the first data element that appear frequently together in the plurality of second data elements. In some examples, data analytics processor 202C executes instructions of the data analytics system 216 to perform data analytics based on one of a determination of an intersection space for the encrypted data elements, and an embedding of the encrypted data elements in a metric space. In some examples, data analytics processor 202C executes instructions of the data analytics system 216 to identify data elements of the plurality of second data elements that are similar to the first data element.

Data analytics processor 202C executes instructions of the data analytics system 216 to distribute, via a computing device, results of the data analytics to an information retrieval system.

Retrieval memory 204D also stores instructions to be executed by retrieval processor 202D including instructions for the information retrieval system 218 to receive the results of the data analytics from the data analytics system. In some examples, retrieval processor 202D executes instructions for the information retrieval system 218 to decrypt the encrypted data elements.

Input devices (e.g., first input devices 206A, second input devices 206B, analytics input devices 206C, and retrieval input devices) include a keyboard, mouse, data ports, and/or other suitable devices for inputting information into respective processing systems. In some examples, input devices are used to input a query, data elements, parameters for data analytics and so forth. For example, a user at a first hospital may interact with first processing system 200A via first input devices 206A to securely retrieve information associated with a second hospital. Output devices (e.g., first output devices 208A, second output devices 208B, analytics output devices 208C, and retrieval output devices) include a monitor, speakers, data ports, and/or other suitable devices for outputting information from respective processing system. In some examples, output devices may be utilized to provide results of the data analytics.

Figure 3:
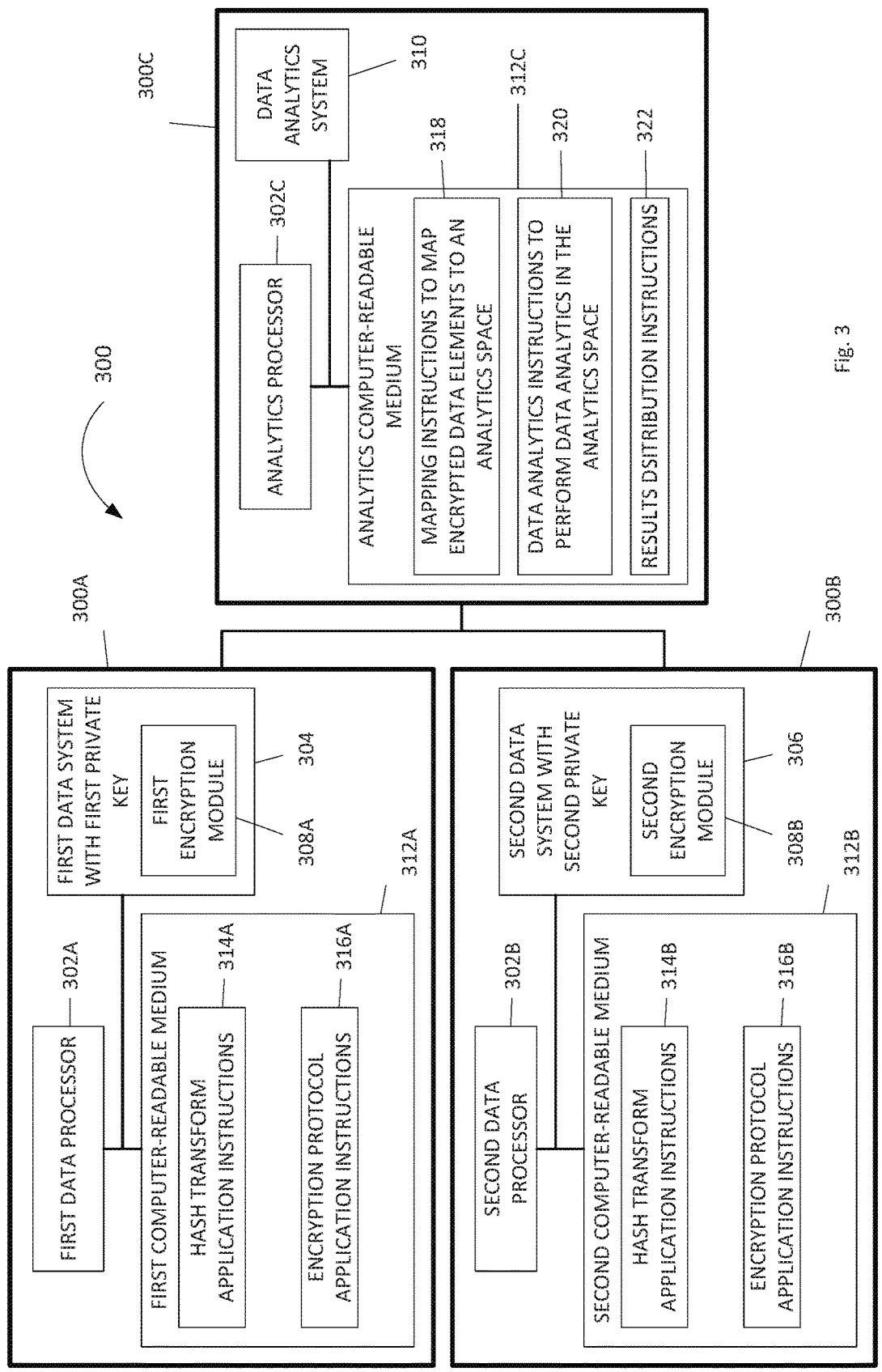
FIG. 3 is a block diagram illustrating one example of a computer readable medium for data analytics on encrypted data elements.

FIG. 3 is a block diagram illustrating one example of a computer readable medium for data analytics on encrypted data elements. Processing system 300 may include a plurality of processors and computer readable mediums to perform designated functions. In some examples, processing system 300 includes a first processing system 300A, a second processing system 300B, and an analytics processing system 300C. The first processing system 300A, second processing system 300B, and analytics processing system 300C are coupled to each other through a communication link, such as, for example, a network. In some examples, the first processing system 300A, second processing system 300B, and analytics processing system 300C may be housed behind respective firewalls to prevent unauthorized access to respective data and/or computing resources.

The first processing system 300A includes a first data processor 302A, a first computer readable medium 312A, a first data system 304, including a first encryption module 308A. The first data system 304 and/or the first encryption module 308A includes a first private key for data encryption. The second processing system 300B includes a second data processor 302B, a second computer readable medium 312B, a second data system 306, including a second encryption module 308B. The second data system 306 and/or the second encryption module 308B includes a second private key for data encryption. The analytics processing system 300C includes an analytics processor 302C, an analytics computer readable medium 312C, and a data analytics system 310.

The first data processor 302A, first computer readable medium 312A, first data system 304, and first encryption module 308A are coupled to each other through communication link (e.g., a bus). Likewise, the second data processor 302B, second computer readable medium 312B, second data system 306, and second encryption module 308B are coupled to each other through communication link (e.g., a bus). Similarly, the analytics processor 302C, analytics computer readable medium 312C, and data analytics system 310 are coupled to each other through communication link (e.g., a bus).

As described herein, processing system 300 is a complex processing system comprising sub-systems. For example, first data system 304 and second data system 306 may be housed behind respective secure firewalls that prohibit external access to data stored within each system. Also, for example, the first encryption module 308A and the second encryption module 308B may be sub-systems communicatively linked to one another, for example, to exchange encrypted data elements, and to establish a security protocol. However, while the first encryption module 308A may be able to access the first data system 304, the first encryption module 308A may be prohibited from accessing the second data system 306. Likewise, while the second encryption module 308B may be able to access the second data system 306, the second encryption module 308B may be prohibited from accessing the first data system 304.

First data processor 302A executes instructions included in the first computer readable medium 312A. First computer readable medium 312A includes hash transform application instructions 314A to transform a first data element from the first data system 304. The hash transform application instructions 314A may include instructions to receive a plurality of second data elements from the second data system 306, and transform the plurality of second data elements. The transformations may be based on a hash transform. For example, the transformation of the first data element may be based on the hash function H. In some examples, first computer readable medium 312A includes encryption protocol application instructions 316A of the first encryption module 308A to apply an encryption protocol to the transformed first data element via the first encryption module 308A.

Second data processor 302B executes instructions included in the second computer readable medium 312B. Second computer readable medium 312B includes hash transform application instructions 314B to transform the plurality of second data elements from the second data system 306. The hash transform application instructions 314B may include instructions to receive the first data element from the first data system 304, and transform the first data element. The transformations may be based on a hash transform. For example, the transformation of the plurality of second data elements may be based on the hash function H. In some examples, second computer readable medium 312B includes encryption protocol application instructions 316B of the second encryption module 308B to apply the encryption protocol to the plurality of transformed second data elements via the second encryption module 308B.

In some examples, first computer readable medium 312A includes encryption protocol application instructions 316A of the first encryption module 304 to apply a first encryption via the first encryption module 308A to the transformed first data element, and provide the encrypted first data element to the second encryption module 308B. In some examples, second computer readable medium 312B includes encryption protocol application instructions 316B of the second encryption module 308B to apply a plurality of second encryptions via the second encryption module 308B, to the plurality of second data elements, and provide the plurality of encrypted second data elements to the first encryption module 308A.

In some examples, first computer readable medium 312A includes encryption protocol application instructions 316A of the first encryption module 308A to apply the first encryption via the first encryption module 308A to the plurality of encrypted second data elements. In some examples, second computer readable medium 312B includes encryption protocol application instructions 316B of the second encryption module 308B to apply the plurality of second encryptions via the second encryption module 308B to the encrypted first data element.

In some examples, first computer readable medium 312A includes encryption protocol application instructions 316A of the first encryption module 308A to provide the encrypted data elements via the first encryption module 308A to the data analytics system 310. In some examples, second computer readable medium 312B includes encryption protocol application instructions 316B of the second encryption module 308B to provide the encrypted data elements via the second encryption module 308B to the data analytics system 310.

Analytics computer readable medium 312C includes mapping instructions 318 of a data analytics system 310 to map the encrypted data elements to an analytics space. In some examples, the mapping instructions 318 include instructions to map to an intersection space. In some examples, the mapping instructions 318 include instructions to embed the encrypted data elements in a metric space.

In some examples, analytics computer readable medium 312C includes data analytics instructions 320 of the data analytics system 310 to perform data analytics on the encrypted transformed data elements in the analytics space. In some examples, analytics computer readable medium 312C includes data analytics instructions 320 of a data analytics system 310 to identify a plurality of data components of the first data element that appear frequently together in the plurality of second data elements. In some examples, analytics computer readable medium 312C includes data analytics instructions 320 of a data analytics system 310 to perform cohort analysis by identifying data elements that behave as cohorts based on their data characteristics. In some examples, analytics computer readable medium 312C includes data analytics instructions 320 of a data analytics system 310 to perform a type of orthogonal subspace clustering by identifying frequent value sets (i.e., values that tend to appear together for measurement items). In some examples, the first data element and the plurality of second data elements may be identified based on a parameter, and analytics computer readable medium 312C may include data analytics instructions 320 of a data analytics system 310 to identify one of trends and correlations based on the parameter.

Analytics computer readable medium 312C includes results distribution instructions 322 of a data analytics system 310 to distribute results of the data analytics to an information retrieval system. In some examples, the information retrieval system is the first data system 304. In some examples, the information retrieval system is the second data system 306. In some examples, the information retrieval system is a combination of the first data system 304, and the second data system 306. For example, a portion of the results may be distributed to the first data system 304, and another portion of the results may be distributed to the second data system 306. In some examples, the information retrieval system may be a third party distinct from the first data system 304 and the second data system 306. In some examples, the information retrieval system may include at least one third party distinct from the first data system 304 and the second data system 306. In some examples, analytics computer readable medium 312O includes results distribution instructions 322 of a data analytics system 310 to provide the data analytics to the first data system 304 maintained by a first hospital, and to a second data system 306 maintained by a second hospital, where the first and second hospitals are engaged in encrypted information sharing.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system are identified and refer to a combination of hardware and programming configured to perform a designated function. As illustrated in FIG. 3, the programming may be processor executable instructions stored on a tangible computer readable medium, and the hardware may include respective processors for executing those instructions. Thus, computer readable medium may store program instructions that, when executed by processor, implement the various components of the processing system. For example, first computer readable medium 312A may store program instructions that, when executed by first data processor 302A, implement the various components of the first processing system 300A. Also, for example, second computer readable medium 312E may store program instructions that, when executed by second data processor 302B, implement the various components of the second processing system 300B. As another example, analytics computer readable medium 312C may store program instructions that, when executed by analytics processor 302C, implement the various components of the analytics processing system 300C.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium may be any of a number of memory components capable of storing instructions that can be executed by the respective processor. Computer readable medium may be non-transitory in the sense that it does not encompass a transitory signal but instead is made up of one or more memory components configured to store the relevant instructions. Computer readable medium may be implemented in a single device or distributed across devices. Likewise, the processor (e.g., first data processor 302A, second data processor 302B, and analytics processor 302C) represents any number of processors capable of executing instructions stored by the respective computer readable medium (e.g., first computer readable medium 312A, second computer readable medium 312B, and analytics computer readable medium 312C, respectively). The respective processors may be integrated in a single device or distributed across devices. Further, the respective computer readable medium may be fully or partially integrated in the same device as the respective processor (as illustrated), or it may be separate but accessible to that device and processor. In some examples, computer readable medium may be a machine-readable storage medium.

Figure 4:
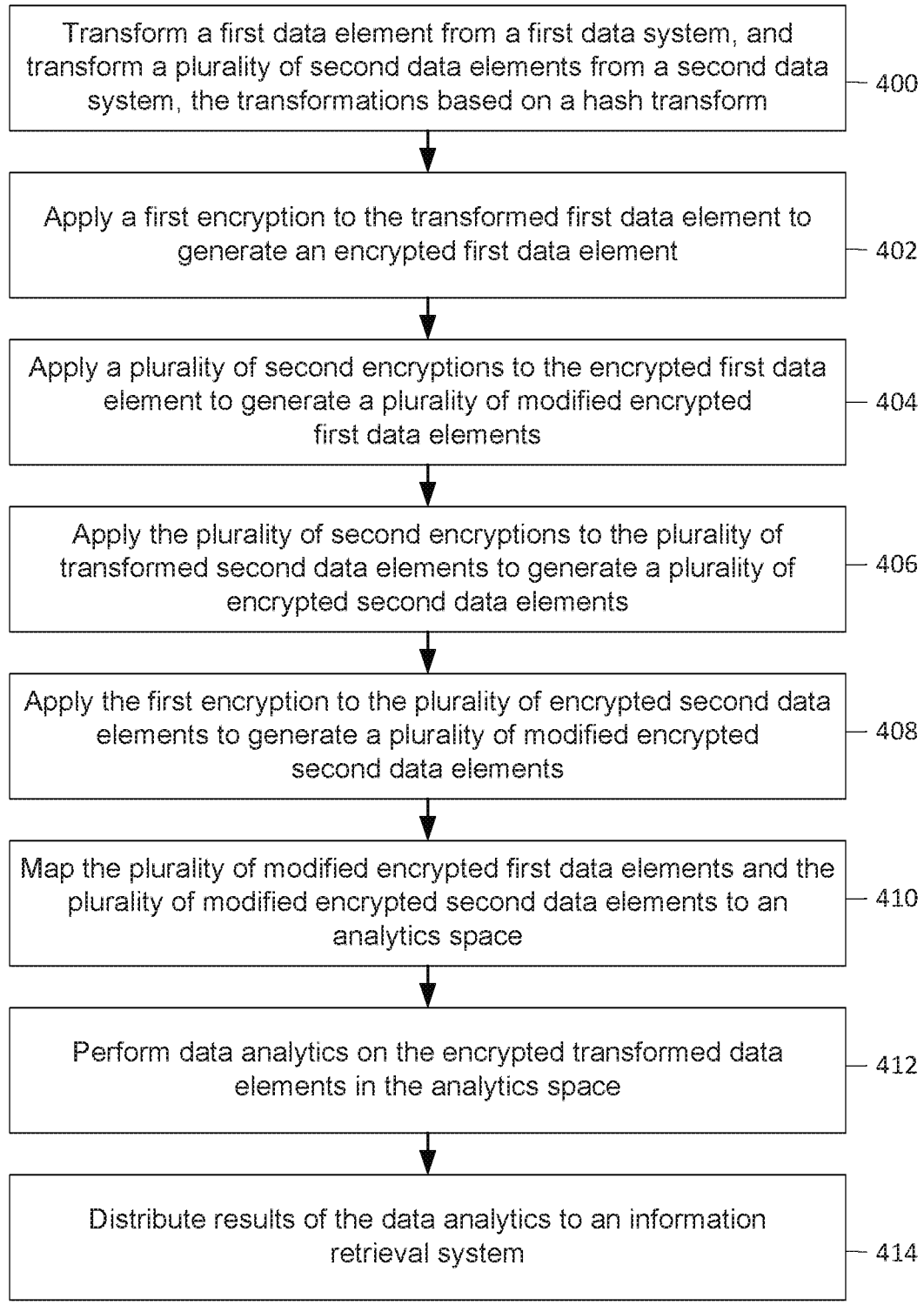
FIG. 4 is a flow diagram illustrating one example of a method for data analytics on encrypted data elements.

FIG. 4 is a flow diagram illustrating one example of a method for data analytics on encrypted data elements. At 400, a first data element from a first data system, and a plurality of second data elements from a second data system are transformed, the transformations based on a hash transform. At 402, a first encryption is applied to the transformed first data element to generate an encrypted first data element. At 404, a plurality of second encryptions are applied to the encrypted first data element to generate a plurality of modified encrypted first data elements. At 406, the plurality of second encryptions are applied to the plurality of transformed second data elements to generate a plurality of encrypted second data elements. At 408, the first encryption is applied to the plurality of encrypted second data elements to generate a plurality of modified encrypted second data elements. At 410, the plurality of modified encrypted first data elements and the plurality of modified encrypted second data elements are mapped to an analytics space. At 412, data analytics are performed based on the on the encrypted transformed data elements in the analytics space. At 414, results of the data analytics are distributed to an information retrieval system.

In some examples, performing the data analytics may include identifying a plurality of data components of the first data element that appear frequently together in the plurality of second data elements.

In some examples, performing the data analytics may include identifying data elements of the plurality of second data elements that are similar to the first data element.

In some examples, the first data element and the plurality of second data elements may be identified based on a parameter, and performing the data analytics may include identifying one of trends and correlations based on the parameter. In some examples, the parameter may be one of time and geolocation.

In some examples, the information retrieval system includes at least one of the first data system and the second data system. For example, the information retrieval system may be the first data system. Also, for example, the information retrieval system may be the second data system. As another example, the information retrieval system may be a combination of the first data system, and the second data system. For example, a portion of the results may be distributed to the first data system, and another portion of the results may be distributed to the second data system. In some examples, the information retrieval system may be a third party distinct from the first data system and the second data system. In some examples, the information retrieval system may include at least one third party distinct from the first data system and the second data system.

In some examples, the data analytics system may map the encrypted data elements to the analytics space based on one of a determination of an intersection space for the encrypted data elements, and an embedding of the encrypted data elements in a metric space.

In some examples, the first data element and the plurality of second data elements may be augmented with random numbers.

Examples of the disclosure provide a generalized system for data analytics on encrypted data elements. The generalized system provides a protocol that decouples data privacy from data analytics, and allows for a wide range of analytics to be performed securely.

Although the examples are described with a first data element in the first dataset, the techniques disclosed herein may be applied to more than one data element in the first dataset. For example, a first data set may include a plurality of first data elements, and top k second data elements may be identified that are similar to the plurality of first data elements.

Although specific examples have been illustrated and described herein, especially as related to numerical data, the examples illustrate applications to any dataset. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a first data system including a first processor and a first non-transitory machine readable storage medium that comprise instructions executable by the first processor to:
store a first data element identified based on a parameter; and
apply, by a first encryption module, a first encryption protocol with a first private key to the first data element to encrypt the first data element;
a second data system including a second processor and a second non-transitory machine readable storage medium that comprise instructions executable by the second processor to:
store a plurality of second data elements identified based on the parameter; and
apply, by a second encryption module, a plurality of second encryption protocols with a second private key to the plurality of second data elements to encrypt the plurality of second data elements;
the first encryption module and the second encryption module communicatively linked to one another, to:
provide the first encrypted data element to the second encryption module;
provide the plurality of encrypted second data elements to the first encryption module;
apply the first encryption protocol to the plurality of encrypted second data elements by the first encryption module to generate a plurality of modified encrypted second data elements; and
apply the plurality of second encryption protocols to the encrypted first data element by the second encryption to generate a plurality of modified encrypted first data elements; and
a data analytics system to:
map the plurality of modified encrypted second data elements and the plurality of modified encrypted first data elements encrypted data elements to an analytics space;
perform data analytics based on the mapped data elements, wherein to perform data analytics, the data analytics system identifies at least one of trends or correlations based on the parameter, indicative of similarities between the first data element and second data elements in the analytics space; and
distribute, via a computing device, results of the data analytics to an information retrieval system in response to a request from the information retrieval system.

2. The system of claim 1, wherein the data analytics system further maps the plurality of modified encrypted second data elements and the plurality of modified encrypted first data elements based on one of a determination of an intersection space for the encrypted data elements, and an embedding of the encrypted data elements in a metric space.

3. The system of claim 1, wherein the information retrieval system includes at least one of the first data system and the second data system.

4. The system of claim 1, wherein the data analytics includes identifying a plurality of components of the first data element that appear frequently together in the plurality of second data elements.

5. The system of claim 1, wherein the first data element and the plurality of second data elements are identified based on a parameter, and the data analytics includes identifying one of trends and correlations based on the parameter.

6. The system of claim 5, wherein the parameter is one of time and geolocation.

7. The system of claim 1, wherein the first data element and the plurality of second data elements are augmented with random numbers.

8. A computer implemented method executable by at least one processor for mediated analytics, the method comprising:
transforming a first data element from a first data system, and transforming a plurality of second data elements from a second data system, the transformations based on a hash transform, wherein the first data element and the plurality of second data elements are identified based on a parameter;
applying a first encryption to the transformed first data element to generate an encrypted first data element;
applying a plurality of second encryptions to the encrypted first data element to generate a plurality of modified encrypted first data elements;
applying the plurality of second encryptions to the plurality of transformed second data elements to generate a plurality of encrypted second data elements;
applying the first encryption to the plurality of encrypted second data elements to generate a plurality of modified encrypted second data elements;
mapping the plurality of modified encrypted first data elements and the plurality of modified encrypted second data elements to an analytics space;
performing data analytics on the encrypted transformed data elements in the analytics space, wherein performing the data analytics includes identifying at least one of trends or correlations based on the parameter, indicative of similarities between the first data element and second data elements in the analytics space; and
distributing results of the data analytics to an information retrieval system in response to a request from the information retrieval system.

9. The method of claim 8, wherein performing the data analytics includes identifying a plurality of data components of the first data element that appear frequently together in the plurality of second data elements.

10. The method of claim 8, wherein the first data element and the plurality of second data elements are identified based on a parameter, and wherein performing the data analytics includes identifying one of trends and correlations based on the parameter.

11. The method of claim 10, wherein the parameter is one of time and geolocation.

12. The method of claim 8, wherein the information retrieval system includes at least one of the first data system and the second data system.

13. At least one non-transitory computer readable medium storing machine readable instructions executable by at least one processor to:
- apply, by a first encryption module, a first encryption protocol with a first private key to a first data element to encrypt the first data element, wherein the first data element is identified based on a parameter;
- apply, by a second encryption module, a plurality of second encryption protocols with a second private key to a plurality of second data elements to encrypt the plurality of second data elements, wherein the plurality of second data elements are identified based on the parameter;
- provide the first encrypted data element to the second encryption module;
- provide the plurality of encrypted second data elements to the first encryption module;
- apply the first encryption protocol to the plurality of encrypted second data elements by the first encryption module to generate a plurality of modified encrypted second data elements;
- apply the plurality of second encryption protocols to the encrypted first data element by the second encryption to generate a plurality of modified encrypted first data elements;
- map the plurality of modified encrypted second data elements and the plurality of modified encrypted first data elements encrypted data elements to an analytics space;
- perform data analytics based on the mapped data elements, wherein to perform data analytics, the at least one processor identifies at least one of trends or correlations based on the parameter, indicative of similarities between the first data element and second data elements in the analytics space; and
- distribute, via a computing device, results of the data analytics to an information retrieval system in response to a request from the information retrieval system.

* * * * *